Sept. 17, 1929.   T. S. KEMBLE   1,728,891
REAR AXLE FOR SIX-WHEEL TRUCKS
Filed June 13, 1927   2 Sheets-Sheet 1
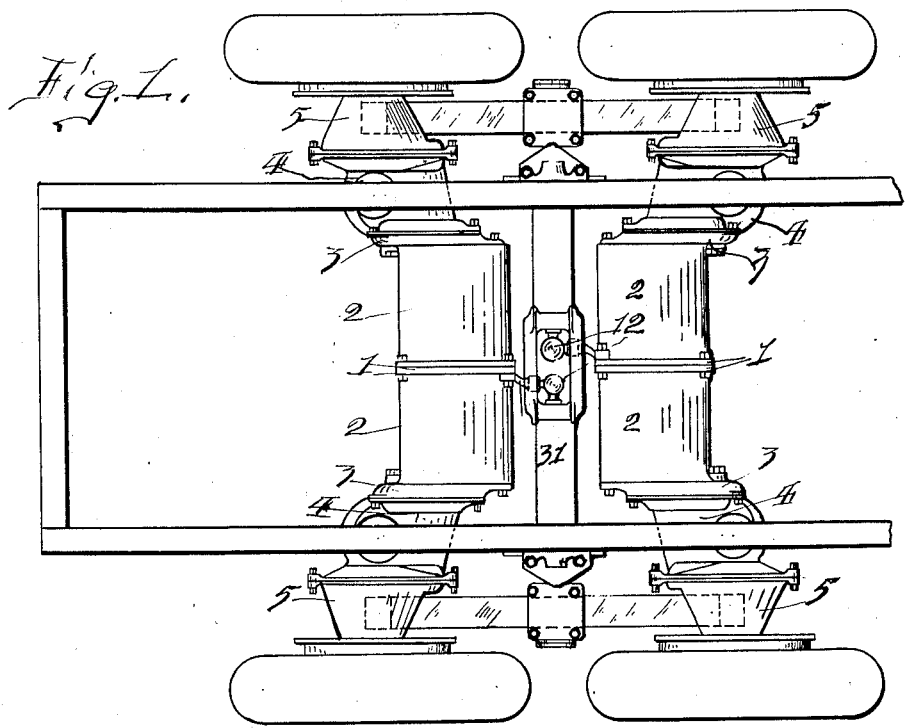
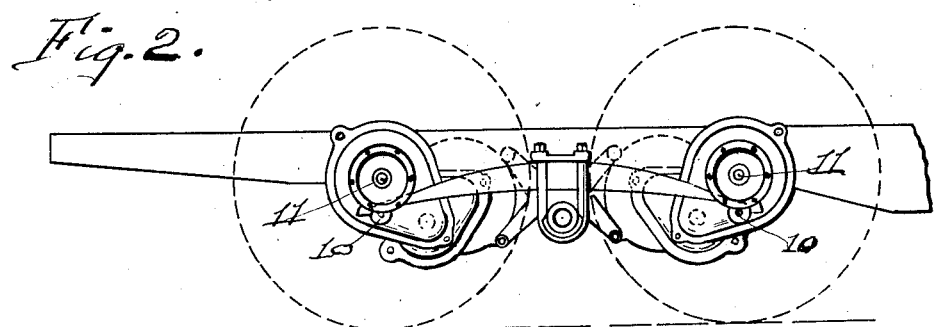
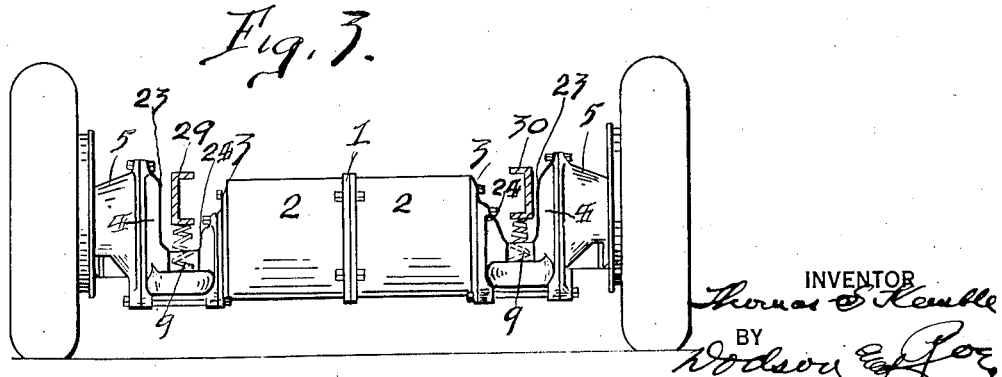

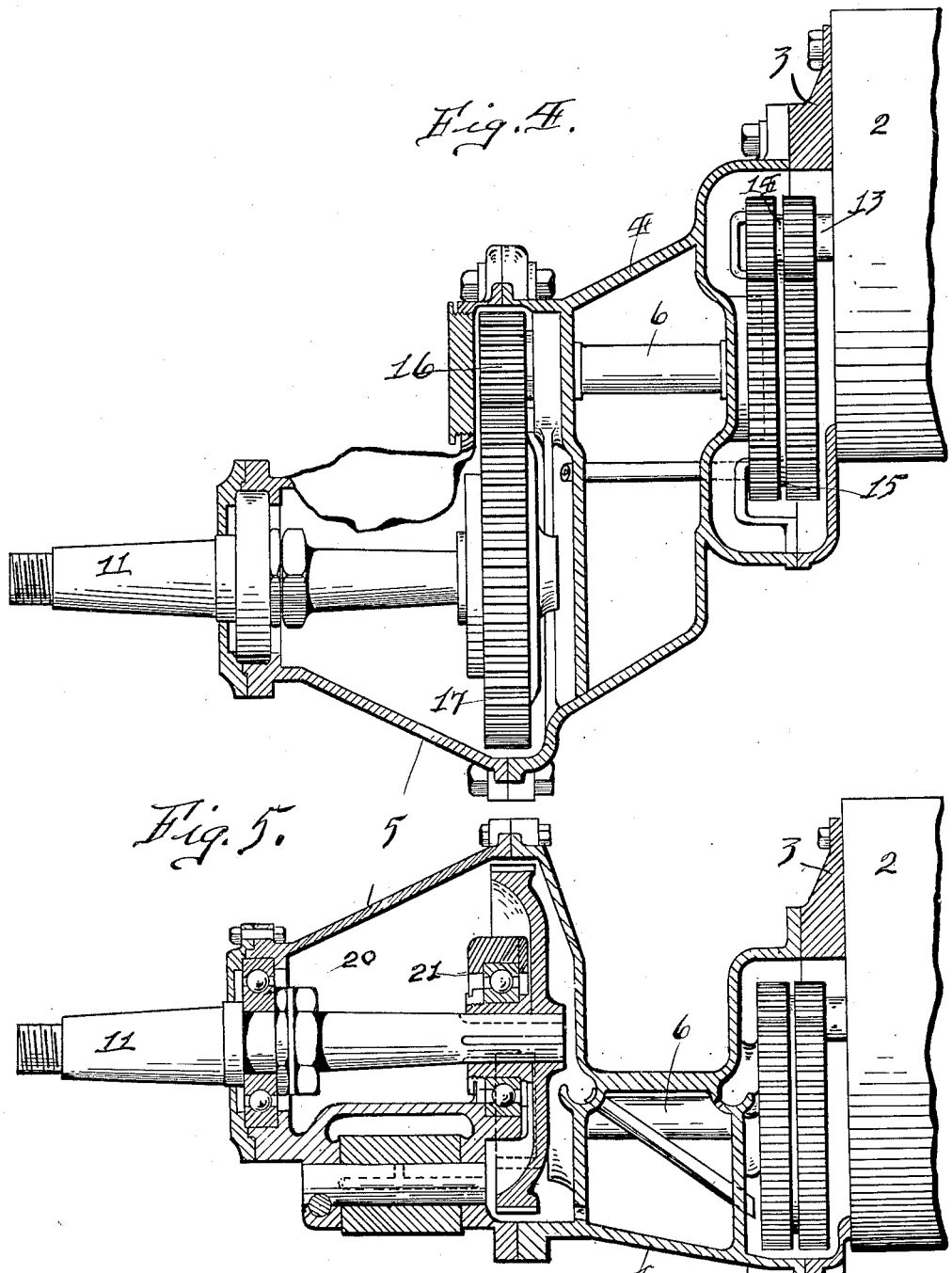

Patented Sept. 17, 1929

1,728,891

UNITED STATES PATENT OFFICE

THOMAS S. KEMBLE, OF LAKEWOOD, OHIO, ASSIGNOR TO UNIVERSAL GAS ELECTRIC COMPANY, OF LAWRENCE, KANSAS, A CORPORATION OF DELAWARE

REAR AXLE FOR SIX-WHEEL TRUCKS

Original application filed July 2, 1924, Serial No. 723,772. Divided and this application filed June 13, 1927. Serial No. 198,658.

This application is a division of my copending application, Serial No. 723,772.

In auto busses particularly and in trucks for some classes of service it is very desirable to provide a very low chassis frame and floor, but where the side member passes over the rear axle there are certain well known conditions which limit the freedom of the designer in providing low height. It is therefore common practice to provide what is known as a "kick up" in the side member where it passes over the rear axle. This "kick up" involves increased cost of the side member and when used in combination with a low floor, it usually involves an extension of the wheel housing to cover the "kick up". This extension of the wheel housing involves further additional expense and clutters up the floor in an undesirable manner.

My invention has for its object the provision of a lower side frame over the rear axle with the accompanying advantages which are obvious from the above discussion.

My invention has for its further object to provide for the location of the member which carries the live axle shaft, countershaft and motor center line and torque are pivot, so as to permit the construction of a relatively low body and chassis and to reduce the unsprung weight.

My means for accomplishing the foregoing objects may be more readily understood by having reference to the accompanying drawings, which are hereto annexed and form a part of this specification, in which—

Fig. 1 is a plan view of a fragmentary portion of the chassis frame of a truck or bus, showing the complete assembly of the driving mechanism with the attachments to the frame;

Fig. 2 is a side elevation of the same, the wheels being shown in phantom in order to disclose axles and side spring to view;

Fig. 3 is a rear end elevation of the construction as shown in Fig. 1, the side members of the chassis frame being shown in section;

Fig. 4 is a plan view of a fragmentary portion of one end of one of the axles, having the walls of the housings broken away to show the interior construction; and Fig. 5 is a side elevation of the same, the housing being shown in section to show its configuration.

Similar reference numerals refer to similar parts throughout the entire description.

In the drawings, at mid-section between the wheels, are end plates 1 of two motors bolted together to form the center section of the load carrying axle. In the following description I shall only describe a single axle, as the construction is duplicated for the other.

Proceeding then from the said mid-section toward one wheel, is the motor frame 2, and a motor end plate 3 which also forms an end plate of the reduction gear housing. The train of the gears, shown in Figs. 4 and 5 in the housing connects the motors (not shown) which are mounted in the motor frame 2 to the wheels. The main body 4 of the reduction gear housing, which carries the counter shaft 6, also carries the auxiliary spring and bumper 9, which form the subject matter of a copending divisional application. The live axle carrying and housing member 5, which also forms an end of the reduction gear housing, carries the spring pin 10 below the live axle 11, and may be used as, or to support, brake anchorage, brake lever pivot, etc.

From the foregoing description it will be apparent, to those skilled in the art, that by this construction the parts 1, 2, 3, 4 and 5, all combine to form the load carrying member, in addition to their other functions. Also, by their arrangement, extending progressively off center from the wheel axis or center line of the live axle 11 toward a torque ball 12, secured to the torque arm support which is attached to the cross member 31 of the chassis so the parts also form part of the torque arm of the axle.

The plates 3 are secured to the outer ends of the motor frame 2 by bolts, or in any other convenient manner.

As clearly seen in Figs. 4 and 5, the plate 4 is provided, adjacent its lower portion, with a laterally extending portion in which is located the countershaft 6 which conveys the power from the motor or drive shaft 13 through the overhung pinion 14 and gear 15, which latter gear is keyed, or otherwise suitably secured, to the countershaft 6. I employ the term "overhung" as it is commonly employed in mechanical construction, to describe a gear or pinion on the axle outside of the bearing. On the other end of said shaft 6 is mounted a pinion 16 which drives the gear 17. This gear 17 is keyed to the live axle 11 which carries the wheel. The axle 11 rotates upon anti-friction bearings 20 and 21, of standard construction. The outer end of the laterally extending portion of the gear housing terminates in a wall 25 which is bolted to the live axle housing member 5, the other end wall 24 of the housing 4 is fastened to the end plate 3 by bolts or in any other suitable manner.

From the foregoing it will be obvious that I provide a space or clearance between the end walls 23 and 24 of the gear housing 4 in which are located the side members 29 and 30 of the chassis, which permits of their being much lower than would be possible if the live axle 11 were extended on a line inside of the frame 2. Moreover, by locating the countershaft 6 lower than the center of the wheel or live axle 11, I provide for lower position of the side members 29 and 30 with a given clearance and by locating the countershaft 6 in a position offset from the center line of the line axle 11, toward the torque ball 12, and I provide for less vertical motion relative to the side members 29 and 30 and body (not shown) than occurs at the wheel center, and thus I reduce the clearance required between the tubular portion 23 and the side members 29 and 30 and I also by this means reduce the unsprung weight.

It will be apparent to those skilled in the art that the wall of the tubular portion 23 being eccentric with the countershaft 6 provides sufficient depth of section for use as a load carrying member, but without reducing the clearance between the tubular portion 23 and the side member 29 and 30, and without raising the side members 29 and 30.

Having thus described my invention, what I regard as new, and desire to secure by United States Letters Patent, is:

1. In a vehicle, an axle comprising a load carrying casing, said casing comprising a middle portion, two end portions and comprising two intermediate portions which connect said middle portion to said end portions, a torque arm attached to said middle portion, wheels rotatively mounted at the outer ends of said end portions, the center line of said middle portion being offset from the center line of said wheels toward said torque arm, the center line of said intermediate portion being offset downward from the center line of said middle portion and downward from the center line of said wheels and being offset from the center line of said wheels toward said torque arm.

2. An axle of a vehicle comprising a casing which forms a load carrying axle, an electric motor within said casing, part of which casing constitutes the frame for said electric motor, the ends of which constitute reduction gear housings, a torque arm secured to said casing, wheels rotatively mounted at the ends of said gear housing, the center line of the motor frame being offset from a vertical plane through the axis of the wheels and towards said torque arm, the center line of a portion of said reduction gear housing being offset downward from the center line of said motor frame and downward from the axis of said wheels.

3. In a motor vehicle, a chassis frame, a pair of electric motors in axial alignment, a second pair of motors, in axial alignment mounted tandem to said first pair, a pair of casings adjacent to each other which form load carrying members, means to flexibly connect said chassis frame to said casings, a torque arm attached to each of said casings, portions of which casings constitute the frames of said motors, the outer end portions of said casings constituting reduction gear housings, wheels rotatably mounted at each end of each of said casings, the center line of each pair of motors being offset from a vertical plane through the axis of its wheels and toward its torque arm, the center line of a portion of said reduction gear housing being offset downward from the center line of said motor frame and downward from the axis of said wheels.

4. In a motor vehicle, a frame, a casing which forms a load carrying axle member, a torque arm attached thereto, means to flexibly connect said frame to said casing, an electric motor within said casing, a portion of said casing constituting the frame of said motor, wheels rotatively mounted at each end of said casing, the center line of the motor being offset from a vertical plane through the axis of the wheels and towards the torque arm, the center line of a portion of said reduction gear housing being offset downward from the center line of said motor frame and downward from the axis of said wheels.

5. An axle of a vehicle comprising a casing, an electric motor in said casing, part of which casing constitutes the frame for said electric motor, the ends of which constitute reduction gear housings, a torque arm secured to said casing, wheels rotatively mounted at the ends of said gear housing, the center line of the motor frame being offset from a vertical plane through the axis of the wheels and towards said torque arm the center line of a portion of said reduction gear housing being offset downward from the center line of said motor frame and downward from the axis of said wheels and being offset from the axis of said wheels toward said torque arm.

6. In a motor vehicle, a chassis frame, a pair of electric motors in axial alignment, a second pair of motors in axial alignment mounted tandem to and adjacent said first pair, a pair of casings which form load carrying axle members in which said motors are mounted, means to flexibly connect said chassis frame to said casings, torque arms attached to said casings, portions of which casings constitute the frames of said motors, the outer end portions of said casings constituting reduction gear housings, wheels rotatably mounted at each end of each of said casings, the center line of each pair of motors being offset from a vertical plane through the axis of its wheels and towards its torque arm, the center line of a portion of said reduction gear housing being offset downward from the center line of said motor frame and downward from the axis of said wheels, and being offset from the axis of said wheels towards said torque arm.

7. In a motor vehicle, a chassis frame, a casing which forms a load carying axle member, a torque arm attached thereto, means to flexibly connect said chassis frame to said casing, an electric motor in said casing, a portion of said casing constituting the frame of said motor, wheels rotatably mounted at each end of said casing, the center line of the motor being offset from a vertical plane through the axis of the wheels and towards the torque arm, the center line of a portion of said reduction gear housing being offset downward from the center line of said motor frame and downward from the axis of said wheels and being offset from the axis of said wheels toward said torque arm.

THOMAS S. KEMBLE.